United States Patent [19]
Tawara

[11] 3,778,098
[45] Dec. 11, 1973

[54] TREE CARRYING VEHICLE
[76] Inventor: Victor Tawara, 3750 S. Federal Blvd., Englewood, Colo. 80110
[22] Filed: Mar. 16, 1972
[21] Appl. No.: 235,200

[52] U.S. Cl............................ 296/3, 214/3, 214/517
[51] Int. Cl.............................................. B60p 3/00
[58] Field of Search .................... 214/3, 146 S, 517; 296/3; 47/37.1

[56] References Cited
UNITED STATES PATENTS

| 2,192,771 | 3/1940 | Hoffer | 214/3 |
| 3,297,182 | 1/1967 | Barry | 214/146.5 X |
| 3,032,368 | 5/1962 | Sigler et al. | 214/3 X |
| 498,608 | 5/1893 | Aylworth | 47/37.1 |
| 783,241 | 2/1905 | Bisset | 214/3 |
| 2,779,486 | 1/1957 | Klein | 214/3 X |
| 1,678,329 | 7/1928 | Clarke | 214/517 |

Primary Examiner—Frank E. Werner
Attorney—Bertha L. MacGregor

[57] ABSTRACT

The tree carrying vehicle comprises a wheeled frame including a pair of spaced apart, longitudinally extending, parallel, inclined side rails which support a plurality of carriers movable thereon, a bucket for receiving the earth embedded root end of a tree for each carrier, cooperating means on each carrier and bucket pivotally detachably mounting a bucket on a carrier, and means retaining each carrier in a selected position on said side rails. Means for raising and lowering opposite ends of the frame to facilitate loading of carriers and buckets on the side rails, and means for retaining the buckets in selected tilted positions are also provided. The buckets have means therein for compressing the earth in which the tree roots are embedded.

2 Claims, 7 Drawing Figures

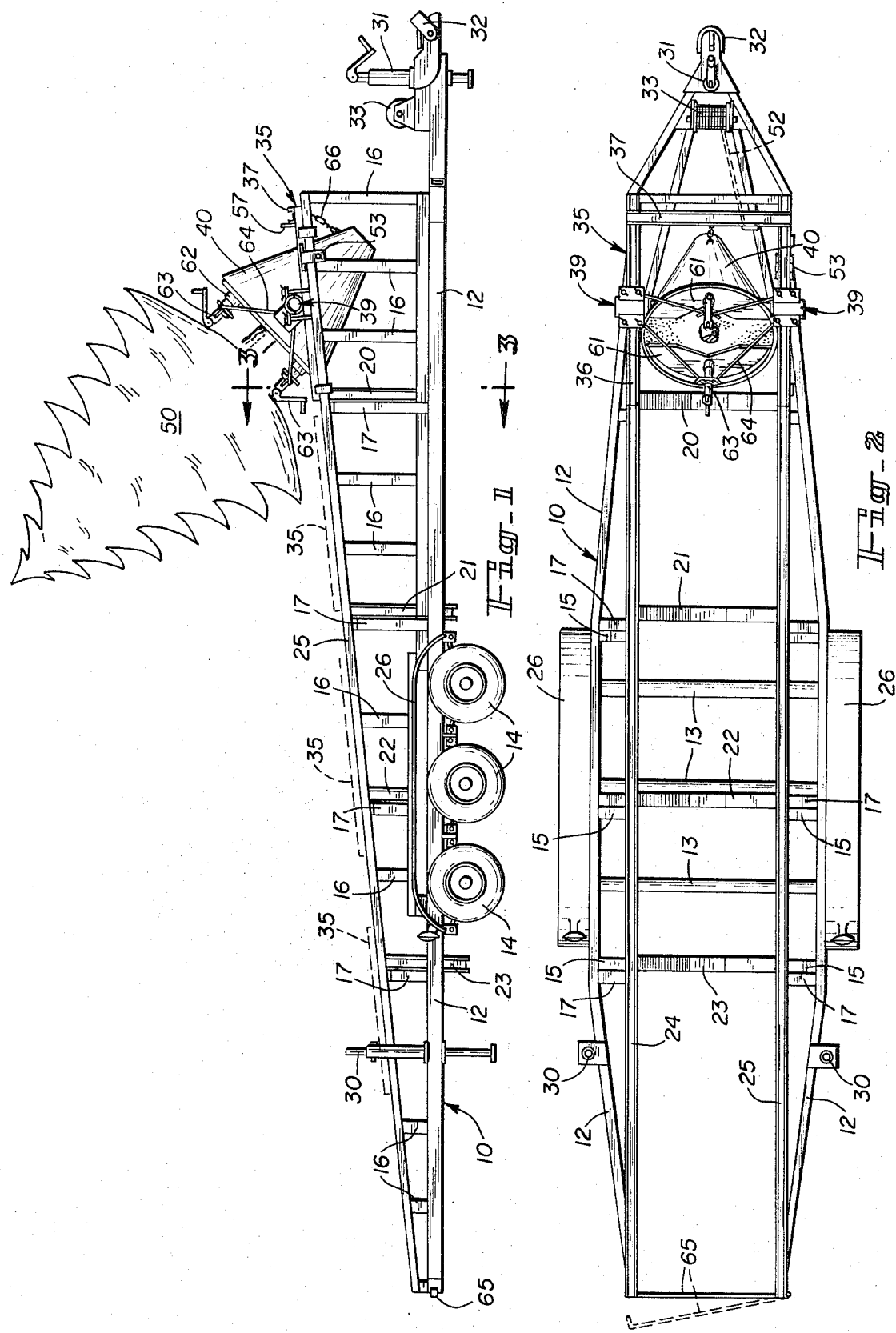

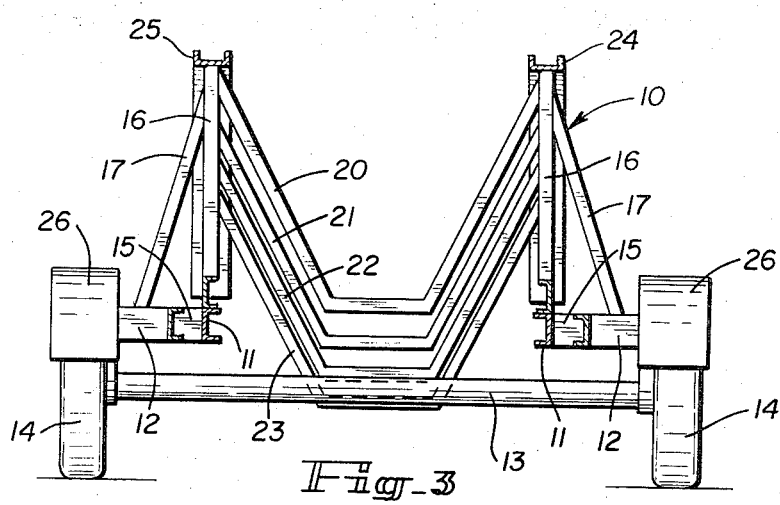
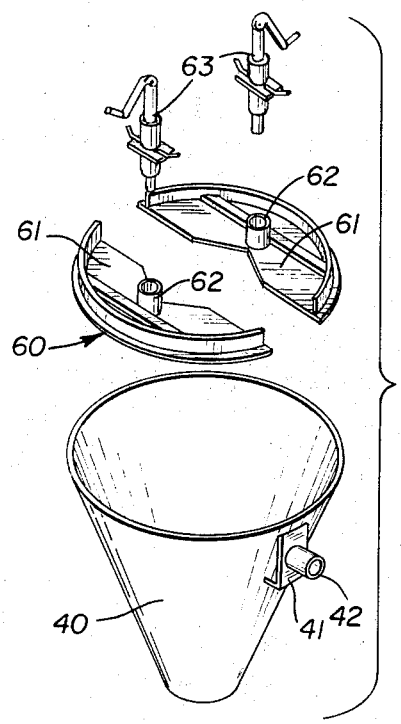
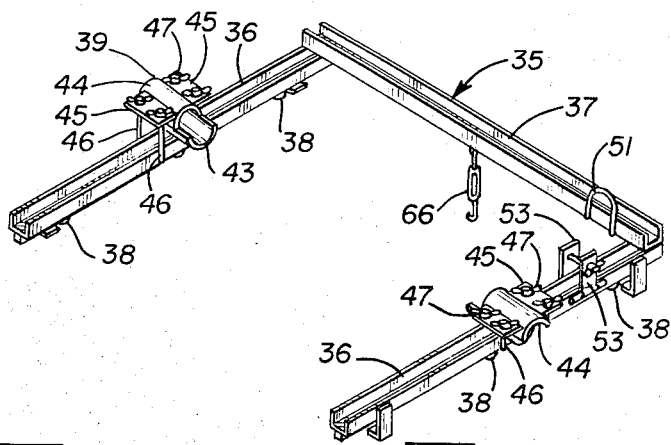
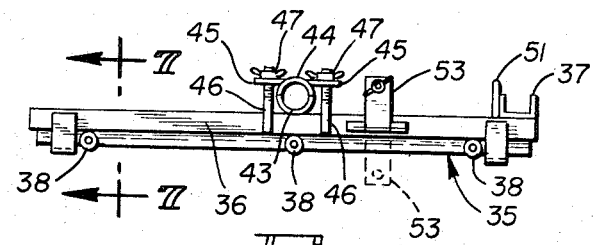
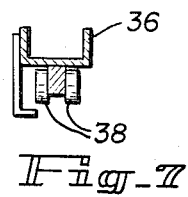

TREE CARRYING VEHICLE

This invention relates to a tree carrying vehicle, such as a trailer adapted to be hitched to a motor driven vehicle for transportation of live trees which have been dug from the ground with their roots embedded in balls of earth for transplanting purposes.

The main object of the invention is to increase the tree carrying capacity of the vehicle and to provide mechanism for placement and removal of the balled trees on the vehicle.

Another object of the invention is to provide buckets for containing the earth embedded root end of the trees and for pivotally supporting the buckets and trees therein on the vehicle at different angles relatively to the bed of the trailer or other tree carrying vehicle.

Another object is to provide means for compacting the earth surrounding the tree roots while in the bucket.

Still another object is to provide means for raising and lowering the vehicle frame at opposite ends of the vehicle to facilitate loading and unloading of the buckets with trees therein, and also for adjusting the load for transportation purposes when the vehicle has been loaded.

Another object is to provide a plurality of carriers, one for each bucket, movable on side rails, and means for moving the carriers. A further object is to provide means for retaining the carriers in selected positions relatively to the side rails.

In the drawings:

FIG. 1 is an elevational side view of a trailer embodying my invention, showing means at the right end for hitching the trailer to a motor driven vehicle (not shown). This view shows one carrier with a tree containing bucket pivotally mounted on the carrier; other carriers being shown in broken lines.

FIG. 2 is a top plan view of FIG. 1.

FIG. 3 is a vertical sectional view in the plane of the line 3—3 of FIG. 1, looking in the direction indicated by the arrows.

FIG. 4 is an exploded perspectively view of the tree carrying bucket, a two part compactor, and two jacks for operating the compactor.

FIG. 5 is a perspective view of one of the bucket carriers including the means for pivotally mounting a bucket thereon, and also showing the means for clamping the carrier on side rails of the trailer.

FIG. 6 is an elevational side view of the bucket carrier shown in FIG. 5.

FIG. 7 is a transverse vertical sectional view in the plane of the line 7—7 of FIG. 6, showing one of the roller bearings mounted on the tree carrier.

In the embodiment of the invention shown in the drawings, the trailer 10 comprises a frame which includes longitudinal side bars 11 and brace bars 12, wheel axles 13 on which wheels 14 are rotatably mounted, cross bars 15, uprights 16 and brace rods 17. Four saddles 20, 21, 22 and 23, are suspended between the uprights 16 and inclined side rails 24 and 25, respectively. The side rails 24, 25 are inclined downwardly from the forward to the rearward end of the trailer as shown in FIG. 1. Fenders are designated 26.

The frame of the trailer 10 can be raised and lowered by crank operated jacks. The rearward end has two jacks 30 mounted in the longitudinal brace bars 12, and the forward end has a jack 31 mounted adjacent the hitch means 32. A winch 33 is mounted on the frame adjacent the forward end of the trailer.

Referring to FIGS. 5 and 6, the bucket carrier 35 is generally U-shaped, comprising a pair of parallel longitudinally extending angle bar arms 36, connected together at one end by a cross angle bar 37. The carrier 35 is movable on the inclined side rails 24, 25 of the trailer frame and is removable therefrom. In this embodiment, four of the carriers are shown. Each carrier 35 is provided with roller bearings 38 as shown in FIGS. 5-7, for rolling on the side rails 24, 25. Each of the angle bar arms 36 has mounted thereon means 39 for pivotally supporting a bucket 40.

Each bucket 40 is cone shaped and has mounted on diametrically opposite sides a bracket 41 and horizontally extending short round shaft 42. The means 39 for pivotally supporting a bucket 40 comprises a cradle 43 mounted on an arm 36 of the carrier 35, for supporting the shaft 42 of the bucket 40. An upper semi-circular part 44 attached to or integral with a plate 45 is clamped onto the cradle 43 to form a sleeve shaped bearing for the shaft 42. Bolts and wing nuts 46, 47, connect the parts as shown in FIGS. 5 and 6. For loading the bucket 40 with a tree 50 (FIG. 1), the carrier 35 is moved downwardly toward the rear end of the frame and then the shafts 42 on the bucket 40 are placed in the cradles 43 of the mounting means 39, and the cooperating member 44, 45, is clamped down by the bolts 46 and nuts 47. The loaded carrier 35 is pulled toward the forward end of the trailer on the side bars 24, 25, by means of a loop 51 connected to a chain 52 and winch 33. The winch may be manually or power operated. When the carrier 35 is in desired position at the forward end of the side rails, it is clamped to the side rails by the pivotally mounted plates 53 which can be downturned and then are connected together below the rails where they contact one of the uprights 16 or bracerods 17 or saddles as shown in FIG. 1, preventing movement of the loaded carrrier relatively to the rails.

To compact the earth surrounding the tree roots, and thus prevent relative movement of the tree and spilling of the earth, compacting means has been provided as shown in FIG. 4 and also in FIGS. 1 and 2. The compactor 60 comprises two half covers 61 designed to overlie the earth around the tree roots in the bucket 40, each half cover being provided with an axially vertical cup 62 for reception of a manually rotatable jack 63. A chain or rope 64 connects the jacks 63 and a fixed part of the bucket 40, such as the bracket 41, and when the chain or rope 64 has been drawn taut, operation of the jacks results in bearing pressure on the half covers 61 and compacting the earth in the bucket 40. Other compacting means may be employed.

A tail gate 65 is pivotally mounted at one side edge to the frame of the trailer 10. The gate is closed when the four or more carriers 35 have been loaded and moved on the side rails 24, 25 to their intended positions. The buckets 40 with trees 50 therein may be tilted at different angles, depending on the size and shape of the trees and are retained in selected position by a turn buckle 66 connecting the bucket 40 the cross bar 37 of the carrier 35.

The carriers 35 on the inclined side rails 24, 25, are located in different inclined planes and the buckets 40 can be tilted at different angles relatively to their carriers, whereby trees being carried in the buckets may extend forwardly or rearwardly at selected angles.

I claim:
1. A tree carrying vehicle for transporting trees and the like, comprising
   a. a wheeled frame including a pair of spaced apart, longitudinally extending, parallel side rails,
   b. a plurality of carriers supported by and movable on said side rails,
   c. a plurality of buckets,
   d. cooperating mounting means on each of the carriers and buckets pivotally detachably mounting a bucket on a carrier,
   e. means retaining a bucket in selected tilted position relatively to the carrier on which it is mounted, said retaining means consisting of a turnbuckle attached to the carrier and detachably connected to the lower part of the bucket, and
   f. means retaining each carrier in a selected position on said side rails.
2. A tree carrying vehicle for transporting trees and the like, comprising
   a. a wheeled frame including a pair of spaced apart, longitudinally extending parallel side rails,
   b. a plurality of carriers supported by said side rails, each carrier comprising side arms connected together by a cross piece, said side arms being movable on said side rails,
   c. a plurality of buckets,
   d. cooperating mounting means on each of the carriers and buckets pivotally detachably mounting a bucket on a carrier, and
   e. means retaining each carrier in a selected position on said side rails, including a pair of plates pivotally mounted on each side arm of a carrier, said plates being upturned when the carrier is being moved on the side rails and being downturned to engage a side rail in selected position to prevent movement of the carrier on the rail.

* * * * *